US006449565B1

(12) United States Patent
Budrow et al.

(10) Patent No.: US 6,449,565 B1
(45) Date of Patent: Sep. 10, 2002

(54) METHOD AND APPARATUS FOR DETERMINING IN REAL-TIME THE FATIGUE LIFE OF A STRUCTURE

(75) Inventors: Steven E. Budrow, Jupiter; Jeffrey R. Davis; Kurt A. Plotts, both of Palm Beach Gardens, all of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/286,378

(22) Filed: Apr. 5, 1999

(51) Int. Cl.[7] .................................................. G01L 1/00
(52) U.S. Cl. ............................. 702/42; 701/14; 378/72
(58) Field of Search ............................. 702/42, 34, 43; 703/7; 701/14; 378/72; 73/587; 244/1 R

(56) References Cited

U.S. PATENT DOCUMENTS 3,387,120 A * 6/1968 Funk et al. .................... 701/14
3,979,579 A 9/1976 Kleinpeter ............... 235/150.2
4,336,595 A 6/1982 Adams et al. .............. 364/508
4,524,620 A * 6/1985 Wright et al. ................. 73/587
4,722,062 A * 1/1988 Breitkopf et al. ............. 702/43
4,764,882 A * 8/1988 Braschel et al. .............. 701/14
4,875,170 A * 10/1989 Sakurai et al. ................ 702/34
5,490,195 A * 2/1996 Berkley ....................... 378/72
5,816,530 A * 10/1998 Grube ........................ 244/1 R
5,847,668 A 12/1998 Morita et al. ............... 341/132
6,212,486 B1 * 4/2001 Huang et al. .................. 703/7

* cited by examiner

*Primary Examiner*—Marc S. Hoff
*Assistant Examiner*—Mohamed Charioui
(74) *Attorney, Agent, or Firm*—Bachman & LaPointe, P.C.

(57) ABSTRACT

A method and apparatus for determining the fatigue life of a structure calculate, in real time, the values for the magnitudes of the stress forces imposed at a particular location on the structure, from one or more sensed structural parameters. Also, the associated temperature values of the structure may be calculated or measured. The calculated stress data are continuously examined, in real time, to determine if the direction of their magnitude is increasing or decreasing. If a change in direction is indicated, the previously stored peak data point in the increasing direction is paired with the previously determined peak data point in the decreasing direction to form a cycle pair. The structural fatigue life is then determined, in real time, from this cycle pair.

35 Claims, 11 Drawing Sheets

METHOD AND APPARATUS FOR DETERMINING IN REAL-TIME THE FATIGUE LIFE OF A STRUCTURE

GOVERNMENT RIGHTS

The U.S. Government may have rights in this invention pursuant to Air Force contracts F33657-91-C-0007.

TECHNICAL FIELD

This invention relates generally to a method and apparatus for interpreting data in real time, and more particularly to a method and apparatus that determine the fatigue life of a structure in real time from data relating to the stress on the structure.

BACKGROUND ART

Various rotating and non-rotating aircraft structures, including those that are part of an aircraft engine (e.g., a compressor or fan rotor disk), have varying lengths of service life. The service life of any structure is generally determined from the nature of the strain or physical deformation within the structure that results from operational use. In turn, the strain is determined by the pattern (i.e., magnitude, frequency) of stress forces applied to the structure over time. Further, the stress forces are determined by the operating conditions encountered by the structure. Therefore, a structure used in certain operating conditions typically has a different service life from that of the identical structure used in different operating conditions.

For any structure, the magnitude of the strain tends to be cyclic over time. Thus, the service life of the structure is generally determined from the number of strain cycles encountered by the structure while in operation. Strain cycles are generally defined by the magnitude of strain transitioning between positive and negative peak values. Over time, these cycles can cause the material comprising the structure to become fatigued, thereby ultimately causing the structure to crack and fail in operation. Thus, it is important to accurately ascertain the accrued and/or remaining service life of a structure to avoid such catastrophic effects.

The magnitude of cyclic strain within certain structures is often times alternating and/or repetitive (i.e., non-random). As such, the service life of those structures is somewhat predictable. For aircraft structures, however, the cyclic strain is most often random, due to the operating conditions of an aircraft. Strain cycles for aircraft engines in normal operation are typically determined by the number of engine speed transients and the accompanying varying temperatures and pressures. Also, more frequent and wider ranging strain cycles are prevalent in military engines than in commercial engines. This is due to the relatively many more transient operating conditions encountered by military engines during normal operation. Thus, it is generally more difficult to determine the fatigue life of a structure that is part of a military aircraft than a commercial aircraft.

Due to its inherent variation during aircraft operation, the cyclic strain within an aircraft structure and the resulting structural fatigue life cannot be accurately predicted or statistically expressed. Therefore, some means or method for determining the amount of accrued strain within an aircraft structure is needed. Also, some means or method for determining the resulting fatigue life of the structure is desired.

Early on in the prior art it was known to determine the fatigue life of an aircraft structure by having a pilot or crewmember manually record when the aircraft achieved certain operating states, such as engine start up and shut down, and aircraft takeoff and landing. The fatigue life of the structure is estimated from these manually recorded data points, often times by comparing the attained aircraft operating states to an empirically determined database.

However, this non-automatic method merely provides a rough and inaccurate approximation of the remaining service life of the aircraft structure. This method is inaccurate because it does not base its determination on operating conditions that are closely related to the service life. This most often results in the structure being replaced much sooner than it needs to be, in order to err on the side of caution. This results in needless costs expended both in parts and labor. Thus, a more accurate method and apparatus of determining the fatigue life of a structure are needed.

U.S. Pat. No. 3,979,579 discloses a processor-based system that automatically records aircraft fatigue cycles by sensing the attainment of various operating points during a typical aircraft flight. These operating points include engine startup, engine shutdown, landing gear status, engine reversal, and throttle setting. The signal processor derives full and fractional fatigue cycles from these operating points. The aircraft engine manufacturers usually define the cycles.

However, an inherent problem with the system of the '579 patent is in its use of relatively broad, normal aircraft operating conditions in making the fatigue cycle determinations. Specifically, these operating conditions are not directly related to the actual fatigue-causing strain within the structure. Thus, the determined fatigue life of the structure is also not correlated to the strain. As a result, the system of the '579 patent is problematic in that it likely results in an aircraft structure being replaced sooner than it has to be, in order to err on the side of caution. While the system of the '579 patent represents an improvement over the aforementioned manual method of fatigue life determination, it is desired to have an automated system that determines the fatigue life of a structure based on a more accurate assessment of the strain that results within the structure from the stress forces imposed on the structure.

U.S. Pat. No. 4,336,595 discloses a computer system that determines the fatigue life of a structure by interpreting the time history of the strain within the structure. A sensed signal from a strain gage is input to a signal processor that determines the strain cycles encountered by the structure over time. The signal processor utilizes a modified version of the well-known "rainflow" cycle pairing method to determine the strain cycles. In general, the rainflow method interprets the inherently relatively complex time history of the random time variations of the magnitude of the strain encountered by any type of structure. The method essentially decomposes the strain time history and counts the strain cycles utilizing several rules that define full and half cycles.

U.S. Pat. No. 5,847,668 discloses a computer system similar to that disclosed in the '595 patent in that it senses strain data using a strain gage. The system also interprets the acquired strain data to determine the strain cycles using the rainflow method, and calculates the fatigue life of the structure.

A common feature of both the '595 and '668 patents is that fatigue life is based primarily on sensed data from a strain gage. Neither patent teaches the use of a temperature of the structure when determining its fatigue life. It is desired to use the temperature of the structure in determining its fatigue life, since, in general, the higher the temperature the shorter the operating life.

Also, the prior art does not teach the use of a calculated value of the stress forces imposed on a structure when determining fatigue life. A problem with strict use of a sensed strain signal in determining fatigue life occurs with rotating structures, including those commonly found in aircraft engines (e.g., a fan disk). The rotating nature of these structures generally precludes use of strain gages.

Further, the rainflow method is typically applied to the accumulated data after the conclusion of the operation of the structure (i.e., after the aircraft flight is complete). Yet, the '595 patent purports to analyze the data in real time as it occurs using a modified version of the rainflow method. Nevertheless, the method disclosed in the '595 patent is based on the relatively complex data interpretation rules associated with the well-known rainflow method.

DISCLOSURE OF INVENTION

An object of the present invention is to improve upon the accuracy of prior art fatigue life calculation systems by utilizing structural operating parameters that closely relate to the stress forces on a structure.

Another object of the present invention is to accurately ascertain, in real time, the fatigue life of a structure by pairing together, in real time, high and low peak data points of stress imposed on a structure.

Yet another object of the present invention is to avoid needless expense in prematurely replacing a structure well prior to the expiration of its useful life.

Still another object of the present invention is to use one or more sensed or calculated temperatures of a structure to more accurately determine the fatigue life of the structure.

Another object of the present invention is to utilize real time calculated values of the stress forces imposed on a rotating structure in determining, in real time, the fatigue life of the structure.

Yet another object of the present invention is to provide a relatively simpler method, as compared to the prior art rainflow method, of identifying, in real time, the occurrence of cycle pairs of high and low peak stress data points.

According to the present invention, a method and apparatus for determining the fatigue life of a structure calculate, in real time, the values for the magnitudes of the stress forces imposed at a particular location on the structure. The stress values are calculated from one or more associated sensed structural parameters. The temperature values of the structure at the particular location may also be calculated or measured.

The calculated stress data points are continuously examined, in real time, to determine if the direction of their magnitude is increasing (i.e., continually greater magnitude data points are being achieved) or decreasing (i.e., continually lesser magnitude data points are being achieved). If a change in direction is indicated, for example, from increasing to decreasing (i.e., the most recent data point is less than the previous data point), then the previously stored peak data point in the increasing direction (i.e., the high peak data point) is paired with the previously determined peak data point in the decreasing direction (i.e., the low peak data point) to form a cycle pair. The structural fatigue life is then determined, in real time, from this cycle pair.

Instead, if the most recent data point in the current direction (e.g., increasing) either equals the most recent data point in that direction, or is greater than the most recent data point in that direction, then no change of direction is indicated. As such, no new cycle pair has yet been identified. The present invention does this until a change in direction is indicated. At that time a cycle pair is determined to exist, from which the structural fatigue life can be determined.

Essentially, the present invention continuously evaluates the current trend (increasing or decreasing) of the magnitude of the stress data. Once the trend reverses, a cycle pair comprising the most recent high and low peak data points is identified, stored in memory, and utilized in determining the fatigue life of the structure. The fatigue life is determined using various cumulative damage calculation methods. The cycle pair is commonly referred to as a "type III cycle". Once a cycle pair is determined, only the high and low data points comprising the pair need to be stored in memory.

The above and other objects and advantages of the present invention will become more readily apparent when the following description of a best mode embodiment of the present invention is read in conjunction with the accompanying drawings.

BEST MODE FOR CARRYING OUT THE INVENTION

Figure 1:
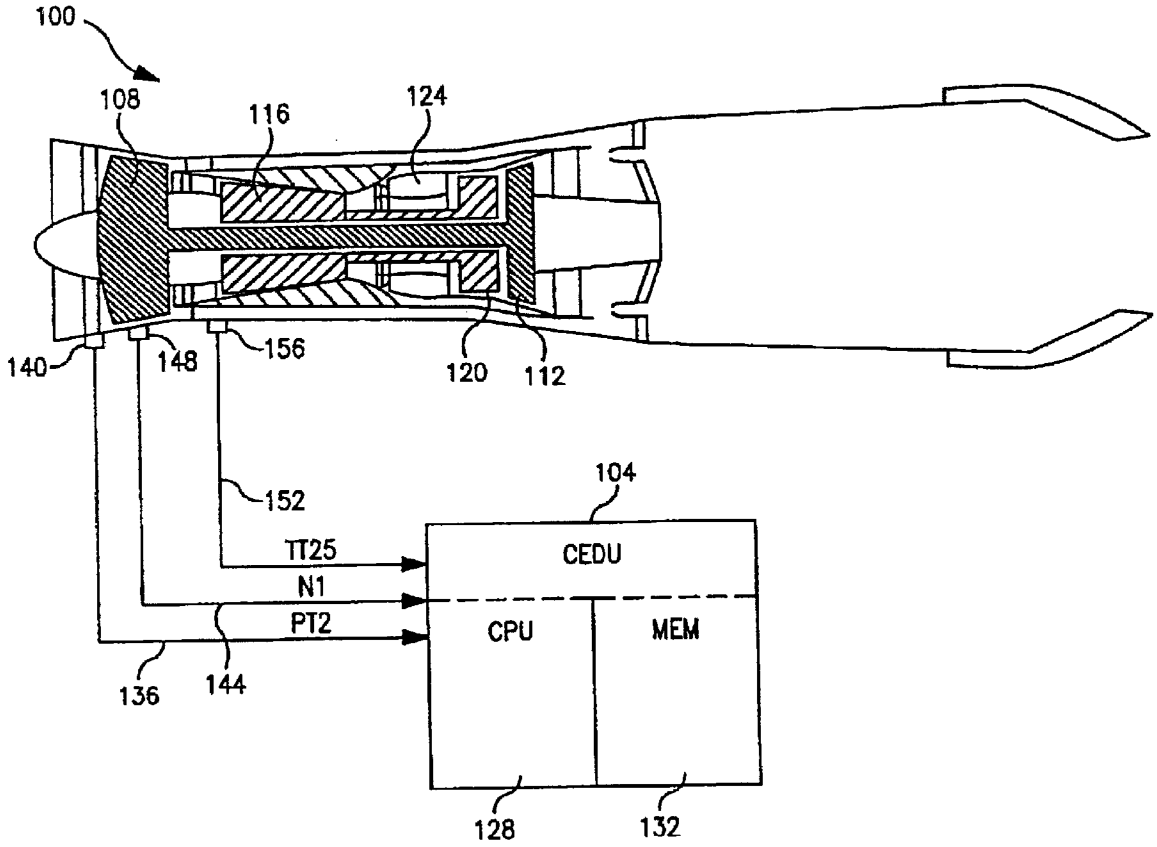
FIG. 1 is an illustration of a gas turbine engine having various rotating components and incorporating a monitoring system that implements the fatigue life determination method and apparatus of the present invention.

Referring to FIG. 1, there illustrated is a known, twin-spool turbofan gas turbine aircraft engine 100, together with a corresponding engine diagnostic monitoring system 104 that implements an exemplary embodiment of the fatigue life monitoring method and apparatus of the present invention, as described in detail hereinafter. In this preferred exemplary embodiment, the present invention monitors various common engine operating parameters and calculates therefrom, in real time, the stress forces at one or more specific physical locations on each of a plurality of various structural components of the engine 100. The invention also interprets, in real time, the calculated stress data in identifying cycles of high and low peak stress data points, and determines therefrom, in real time, the fatigue life of each component.

The gas turbine engine 100 may comprise the Model F119 military aircraft engine provided by the Pratt & Whitney division of United Technologies Corporation, the assignee of the present invention. The engine 100 may include a low-pressure compressor and fan combination 108, connected by a solid shaft to a low-pressure turbine 112. The engine 100 also includes a high-pressure compressor 116 connected by a hollow shaft to a high-pressure turbine 120. A burner section 124 is disposed between the high-pressure compressor 116 and high-pressure turbine 120. The shaft connecting the low-pressure compressor 116 and turbine 120 typically resides within the hollow shaft connecting the high-pressure compressor 108 and turbine 112. As is well known, the low- and high-pressure compressors 108, 116 provide compressed air to the burner 124, which mixes the compressed air with fuel and ignites the fuel/air mixture. The gases produced by the combustion pass through the turbines 112,

120, which extract energy therefrom to power the compressors 108, 116, while the gases also exit the engine 100 to provide thrust to power the plane.

It should be understood that the specific structural details of the engine 100 described and illustrated herein are purely exemplary and form no part of the present invention. Any engine may be utilized in conjunction with the present invention. Further, the broadest scope of the present invention is limited for use with rotating structures such as aircraft engines. Instead, it is contemplated that the present invention may be used with other rotating, as well as non-rotating structures, as should be apparent to one of ordinary skill in the art in light of the teachings herein.

The monitoring system 104 may comprise a comprehensive engine diagnostic unit ("CEDU"), provided by the Hamilton Standard division of United Technologies Corporation, the assignee of the present invention. The CEDU 104, which resides onboard the engine 100, continually receives and selectively records a plurality of engine parameters, such as various speeds, temperatures and pressures. The CEDU 104 uses these parameters in carrying out various engine diagnostic procedures, including the fatigue life monitoring of the present invention. Not described herein are those engine diagnostic procedures carried out by the CEDU 104, but not relevant to the fatigue life monitoring of the present invention.

The CEDU 104 includes a signal processor portion ("CPU") 128 for executing preprogrammed instructions that, for example, command the CPU to perform various calculations. The CEDU 104 also includes a memory portion ("MEM") 132 for storing instructions and various data values, including the results of intermediate calculations performed by the CPU. The CPU may comprise a commercially available microprocessor that executes instructions comprising the fatigue life monitoring of the present invention. The memory portion 132 may comprise various well-known types of commercially available memory devices, such as RAM, ROM, or EPROM.

Input to the CEDU 104 on a plurality of signal lines are signals indicative of various operating parameters of the engine 100. The signals originate from known sensors disposed on the engine 100 at the appropriate locations. Prior to processing by the CPU 128, the signals may be appropriately conditioned in a known manner, for example, by filtering and converting from analog to digital values. This signal conditioning circuitry is not a part of the CPU 128.

For example, input to the CEDU 104 on a signal line 136 is the pressure, PT2, provided by a pressure sensor 140 disposed at the inlet of the low-pressure compressor and fan combination 108. Also input to the CEDU 104 on a signal line 144 is the speed, NI, of the combination 108 from a speed sensor 148. The temperature, TT25, at the inlet to the high-pressure compressor 116 is also input to the CEDU 104 on a signal line 152 from an associated temperature sensor 156. As described in detail hereinafter, these signals may be used by the CEDU 104 to calculate the stress forces at the aft web on a rotating fan disk that is part of the low-pressure compressor/fan combination 108. Further, the temperature signal may be used with the calculated stress forces in calculating the fatigue life of the fan disk at the aft web. Utilizing the temperature of the structure to calculate the structural fatigue life is important because, in general, the higher the temperature of the structure, the shorter the serviceable life of the structure.

Figure 2:
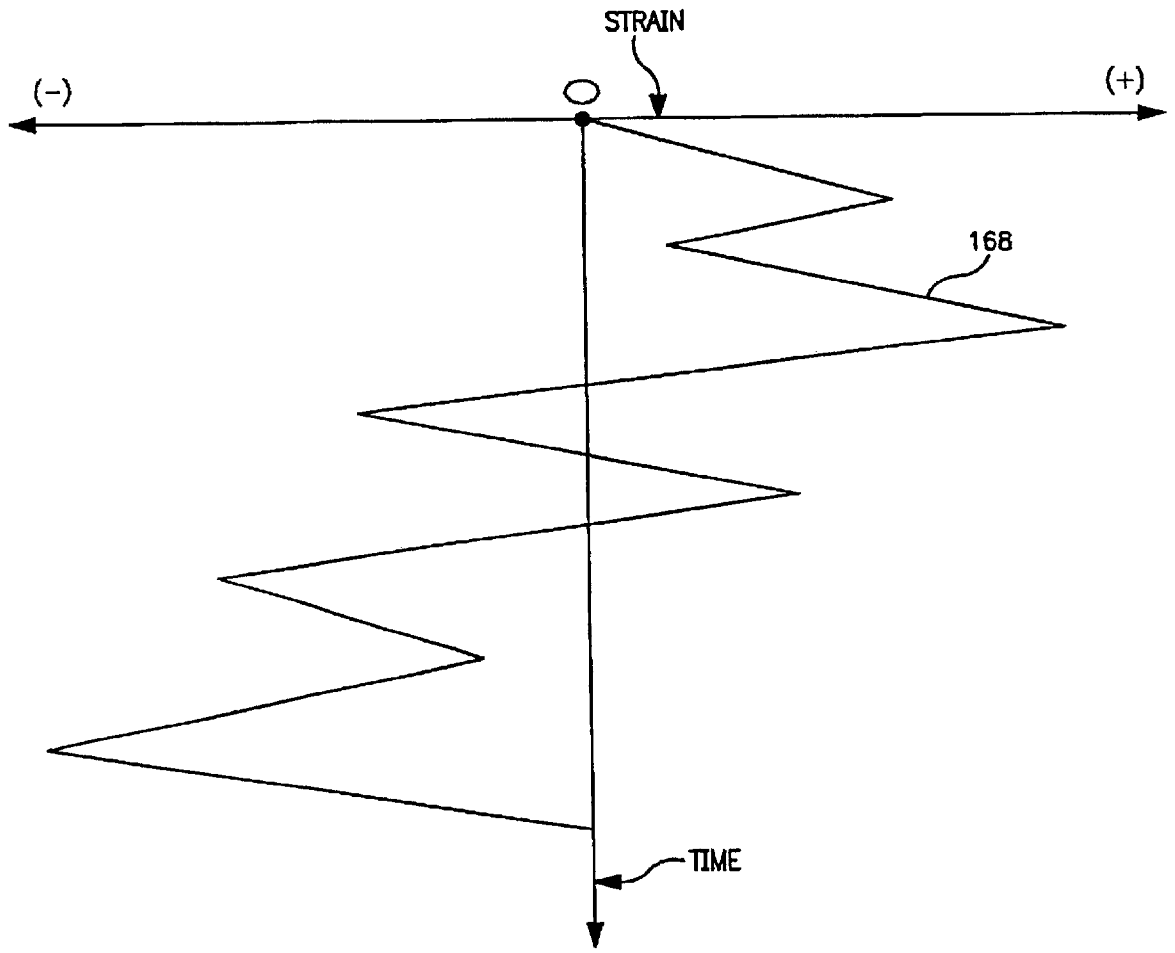
FIG. 2 is a graph depicting a waveform of a typical time history of stress imposed on a rotating structural component that is part of the gas turbine engine of FIG. 1.

Referring to FIG. 2, there illustrated is a graph of an exemplary waveform 168 of the inherently random cyclic magnitudes of the strain within a typical rotating aircraft structure, such as the fan disk. During development ground testing, the strain may typically be sensed by a strain gage on the structure. However, the waveform 168 is also typical of the random cyclic magnitudes of the stress forces on the structure that cause the resulting strain within the structural material.

In accordance with the present invention and as described in detail hereinafter, the stress data values depicted in FIG. 2 are calculated from one or more sensed engine parameters. The inherently random and cyclic excursions illustrated in waveform 168 must be properly interpreted to accurately determine the fatigue life of the structure. This interpretation normally involves some type of cycle determination and counting method that determines the magnitudes of the plurality of peak high ("+") and low ("−") data values and counts these peaks as cycles. Typically, variations of the known rainflow method are used. However, the present invention uses a simpler, accurate method of interpreting data to identify and count cycles. As described in detail with respect to the flowcharts of FIGS. 3–11, the present invention calculates and interprets, in real time, these high and low peak data values, and calculates, in real time, the fatigue life of the structure from the peak values.

Referring to FIGS. 3–11, each flowchart illustrates the control steps carried out by the CPU 128 in implementing the functions of the fatigue life monitoring of the present invention. Typically, the software represented by the flowcharts of FIGS. 3–11 is executed during operation of the aircraft engine, during which time the engine is subject to varying operating conditions, such as speeds, pressures and temperatures. As previously mentioned, these conditions cause varying stress forces on the structure at various locations, thereby causing varying strain or physical deformation within the structure. The amount of strain ultimately affects the length of the serviceable life of the structure. The present invention calculates the stress on the structure to determine the fatigue life of the structure.

The flowcharts depict the software instructions organized as separate subroutines. The subroutines may be repeatedly executed at various times, and as often as necessary, as part of the overall operation of the CEDU 104 in performing various engine diagnostic operations. For example, the subroutine 200 of FIG. 3 may typically be executed only after the occurrence of certain predetermined conditions has been determined elsewhere within the software of the CEDU 104. In the alternative, the subroutine 200 of FIG. 3, together with necessary ones of the associated subroutines of FIGS. 4–11, may be executed at regular intervals of time. The instructions comprising each subroutine may be preprogrammed into the memory portion 132 of the CEDU 104.

In the preferred exemplary embodiment, as-needed ones of the subroutines of FIGS. 3–11 are intended to be utilized together to determine the fatigue life of a rotating aircraft component of a particular single location on that structure. Described herein is an exemplary embodiment for use in calculating the stress on an aft web location of a fan disk that is part of the aircraft engine 100. If the present invention is to be utilized with respect to other locations within the same or different structure, as-needed ones of the subroutines of FIGS. 3–11 are called with respect to each location.

Figure 3:
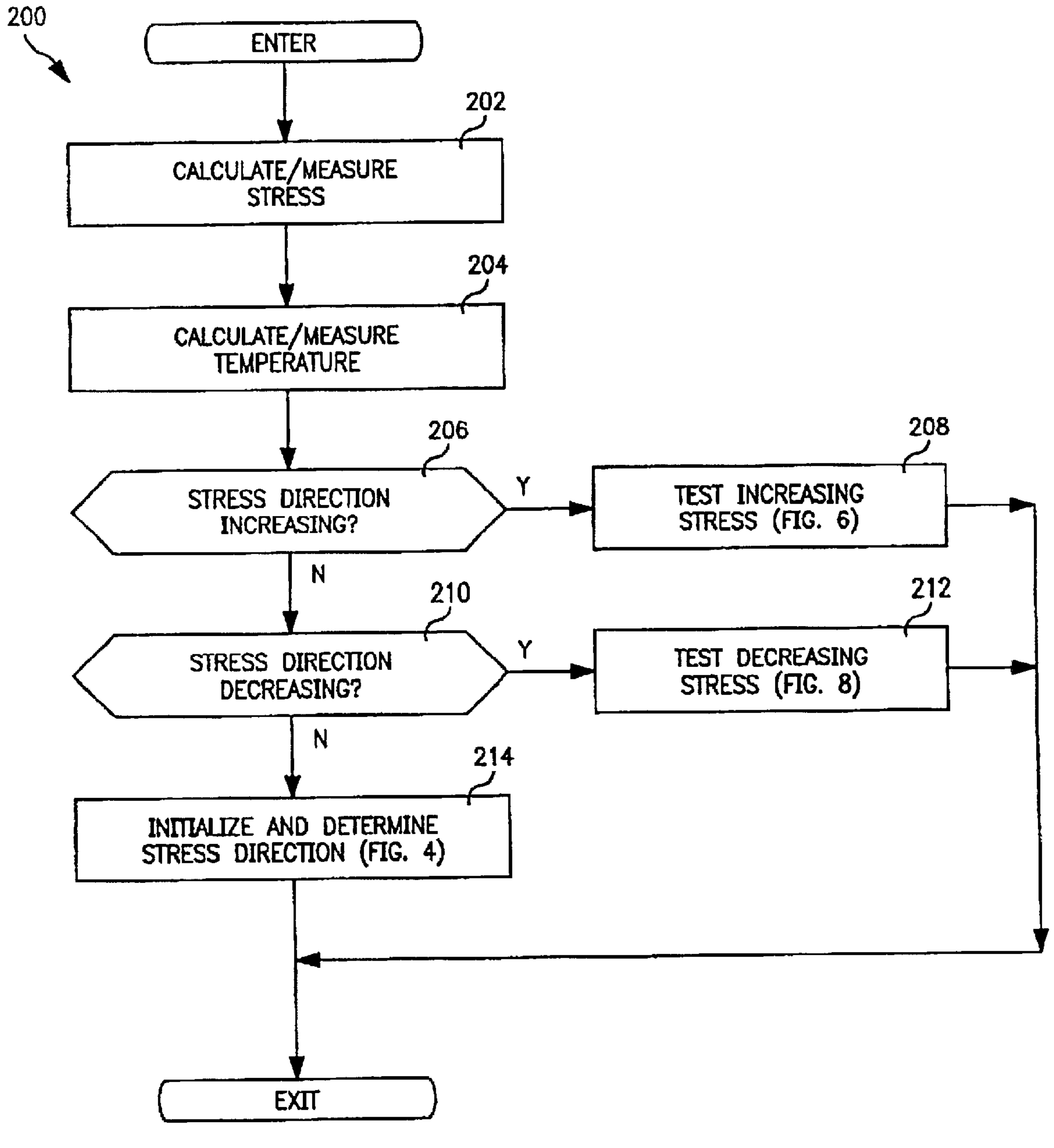
FIGS. 3–11 are flowcharts of various subroutines listing the functional steps implemented by the fatigue life monitoring system of FIG. 1.

Referring to the subroutine 200 of FIG. 3, after an enter step control of the CPU 128 passes to a subroutine 202 that calculates the current value for the stress on the structure (e.g., the fan disk) at a particular location (e.g., the aft web). The stress value is calculated from one or more sensed engine parameters. In an exemplary embodiment, the CPU 128 calculates stress using the sensed pressure signal, PT2, on the line 136 and the sensed speed signal, N1, on the line 144. The stress value ("STRESS") is calculated using a relatively simple algebraic equation having constants with numerical coefficients whose values depend on various physical characteristics of the material comprising the structure. The form of the equation and the values for these coefficients should be apparent to one of ordinary skill in the art. An exemplary equation for calculating stress (in pounds per square inch (PSI)) on the fan disk at the aft web is given by:

$$STRESS=-K1+K2*(N1/1000)^2+K3*PT2 \quad \text{(Eq. 1)}$$

Where K1, K2 and k3 are various constants. The calculated stress value is typically stored in the memory portion 132 of the CEDU 104 for later use.

Control then passes to a subroutine 204 that calculates the current temperature value of the fan disk from one or more sensed engine parameters. Alternatively, in this subroutine 204 a sensed temperature at some relevant engine location may be input to the CPU 128 from the sensor 156. In an exemplary embodiment, the temperature value ("TEMP") is calculated using the sensed value for the TT25 temperature signal on the line 152. The temperature value is calculated using a relatively simple algebraic equation having coefficients whose values depend on various physical characteristics of the material comprising the structure. The form of the equation and the values for these coefficients should be apparent to one of ordinary skill in the art. An exemplary equation for calculating the temperature (in Rankine) on the fan disk at the aft web is given by:

$$TEMP=K1+K2*\ TT25*LagK3 \quad \text{(Eq. 2)}$$

Where K1, K2 and K3 are constants, and "LagK3" represents a delay of K3 seconds, which is the time it takes the temperature to attain 67 percent of its final value. The calculated (or sensed) temperature value is typically stored in the memory portion 132 of the CEDU 104 for later use.

Control then passes to a step 206 where the value of STRESS is checked to see if it is increasing in magnitude. The CPU 128 may perform this step by checking if the current STRESS data value is greater than the most recent STRESS data value. If STRESS is increasing, control passes to a subroutine 208, illustrated in the flowchart of FIG. 6 (described in detail hereinafter), which verifies whether STRESS is increasing. After executing the subroutine 208 of FIG. 6, control exits the subroutine 200 of FIG. 3.

Instead, if the result of the step 206 indicates that STRESS is not increasing, control passes to a step 210 that checks if STRESS is decreasing. The CPU 128 may perform this step by checking if the current STRESS data value is less than the most recent STRESS data value. If STRESS is decreasing, control passes to a subroutine 212, illustrated in the flowchart of FIG. 8 (described in detail hereinafter), which verifies whether STRESS is decreasing. After executing the subroutine 212 of FIG. 8, control exits the subroutine 200 of FIG. 3.

Figure 4:
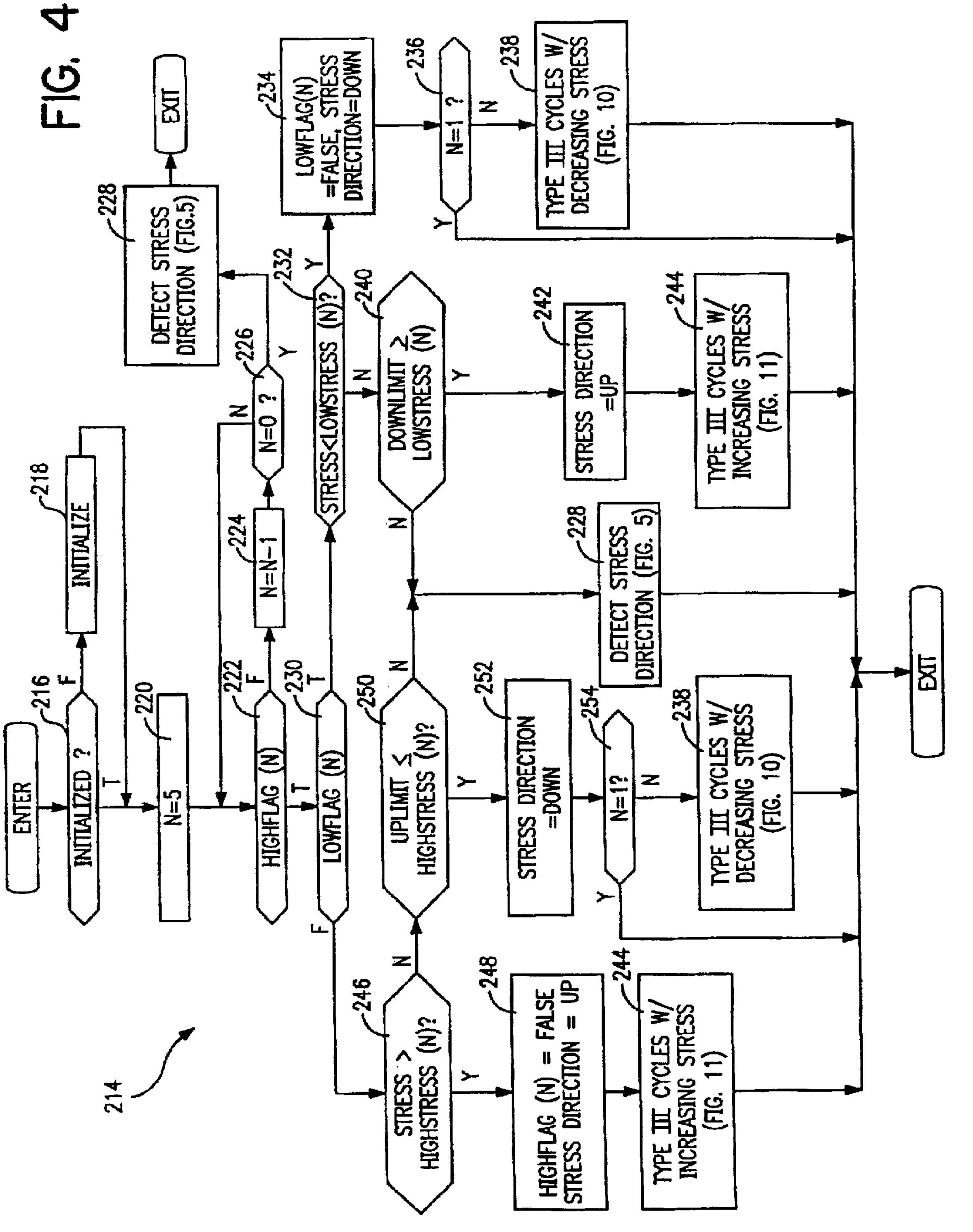

If the result of the step 210 indicates that STRESS is not decreasing, control passes to a subroutine 214, illustrated in the flowchart of FIG. 4, which initializes various variables and verifies the direction of STRESS. After executing the subroutine 214 of FIG. 4, control exits the subroutine 200 of FIG. 3.

Referring to FIG. 4, after an enter step, control passes to a step 216 that checks if various variables have been initialized. If not, control passes to a step 218 that initializes the variables. In an exemplary embodiment, these variables include HIGHSTRESS and LOWSTRESS, which are initialized to the current value of STRESS, from step 202 in FIG. 3. Also initialized are HIGHTEMP and LOWTEMP, which are initialized to the current value of TEMP, from step 204 in FIG. 3. DOWNLIMIT is initialized to the current value of STRESS minus a predetermined constant, while UPLIMIT is initialized to the current value of STRESS plus a predetermined constant. DOWNLIMIT and UPLIMIT are used as threshold limits in the subroutines of FIGS. 3–11, and whose values depend upon the current value of STRESS. The predetermined constants represent an amount of hysteresis built into these variables when they are used in comparison operations, described hereinafter. DOWNLIMIT keeps moving down in value with increasing values of STRESS, while UPLIMIT keeps moving up in value with decreasing values of STRESS.

After initializing the variables in the step 218 (or if it was determined in the step 216 that the variables were already initialized), control passes to a step 220 that initializes the variable N to five. The integer value of N is used as an index within each of several arrays in memory 132. These arrays are HIGHFLAG(N), LOWFLAG(N), HIGHSTRESS(N), and LOWSTRESS(N). The integer value of five indicates that each array has five locations in this exemplary embodiment. Instead, each array could have more or less locations, if desired. When one or more of the five locations within each of the HIGHFLAG(N) and LOWFLAG(N) arrays is a binary value of true, this indicates that a value for each of the corresponding high and low peak values of STRESS (as pointed to by all of the locations in HIGHSTRESS(N) and LOWSTRESS(N) that correspond to HIGHFLAG(N) and LOWFLAG(N) being true)) is stored in memory 132. In contrast, if no locations within either HIGHFLAG(N) or LOWFLAG(N) are true, then no high or low peak STRESS data values are stored in memory. Further, the five locations within each of the HIGHSTRESS(N) and LOWSTRESS(N) arrays point to the specific locations in memory 132 where high and low peak values of STRESS are stored. Thus, the specific locations within HIGHFLAG(N) or LOWFLAG(N) that are a binary value of true point to the corresponding location within HIGHSTRESS(N) or LOWSTRESS(N) that indicate the current location in memory containing the high or low peak STRESS data values.

Control then passes to a step 222 that checks if the position within the HIGHFLAG array, as indicated by the current value of N is true or false. In the first pass through the subroutine 214 of FIG. 4, N equals 5. HIGHFLAG(N) is true if the memory location pointed to by HIGHSTRESS(N) contains a high peak value for STRESS (determined elsewhere in the flowcharts of FIGS. 3–11). On the other hand, HIGHFLAG(N) is false if no high peak STRESS data is stored in the memory location pointed to by HIGHSTRESS (N). If HIGHFLAG(N) is false, control passes to a step 224 that decrements the value of N by one, and then to a step 226 that checks if N equals zero. If N does not equal zero, control branches back to the step 222. If N equals zero, then no high peak STRESS data values are stored in memory. Control then passes to the subroutine 228 of FIG. 5 (described in more detail hereinafter), that determines the direction of STRESS.

If it was determined in the step 222 that HIGHFLAG(N) was true (for any value of N), control passes to a step 230 that checks if the value of LOWFLAG(N) (for the corresponding value of N in which HIGHFLAG(N) was. determined to be true in the step 222) equals the binary value of true. If LOWFLAG(N) is true, then both high and low peak STRESS data values are stored in memory 132. Control then passes to a step 232 that checks if the current value of STRESS is less than the corresponding STRESS value stored in the memory location pointed to by the N position of the LOWSTRESS array. If less, control passes to a step 234 that sets LOWFLAG(N) to false, and sets the variable STRESSDIRECTION to down. This means that STRESS is decreasing and is lower in value than the previous low peak value. Control then passes to a step 236 that checks if N equals one. If so, control exits the subroutine 214 of FIG. 4, since both the LOWFLAG and LOWSTRESS arrays are at their least (i.e., N=1) position. If N does not equal one, control passes to the subroutine 238 of FIG. 10 (described in detail hereinafter) that calculates the fatigue life (i.e., the "type III cycles") of the fan disk in real time. Control then exits the subroutine 214 of FIG. 4.

If the results of the step 232 are such that STRESS is not less than LOWSTRESS(N), then control passes to a step 240 that checks if DOWNLIMIT is greater than or equal to the low peak value in memory pointed to by LOWSTRESS(N). If so, control passes to a step 242 that sets STRESSDIRECTION equal to up. This means that STRESS is increasing. Control then passes to the subroutine 244 of FIG. 11 (described in detail hereinafter) that calculates the fatigue life (i.e., the "type III cycles") of the fan disk in real time. Control then exits the subroutine 214 of FIG. 4.

If the result of the step 240 indicates that DOWNLIMIT is less than LOWSTRESS(N), control passes to the subroutine 228 of FIG. 5 (described in detail hereinafter) that determines the direction of STRESS. Control then exits the subroutine 214 of FIG. 4.

If the result of the step 230 indicates that LOWFLAG(N) is false, control passes to a step that checks if STRESS is greater than HIGHSTRESS(N). If so, control passes to a step 248 that sets HIGHFLAG(N) equal to false, and sets STRESSDIRECTION equal to up. This means that STRESS is increasing. Control then passes to the subroutine 244 of FIG. 11 (described in detail hereinafter) that calculates the fatigue life of the fan disk. Control then exits the subroutine 214 of FIG. 4.

If the result of the step 246 is that STRESS is not greater than HIGHSTRESS(N), control passes to a step 250 that checks if UPLIMIT is less than or equal to HIGHSTRESS (N). If not, control passes to the subroutine 228 of FIG. 5 (described in detail hereinafter) that determines the direction of STRESS. Control then exits the subroutine 214 of FIG. 4. If UPLIMIT is less than or equal to HIGHSTRESS(N), control passes to a step 252 that sets STRESSDIRECTION equal to down. Control then passes to a step 254 that checks if N equals one. If so, control exits the subroutine 214 of FIG. 4. If not, control passes to the subroutine 238 of FIG. 10 (described in detail hereinafter). Control then exits the subroutine 214 of FIG. 4.

Figure 5:
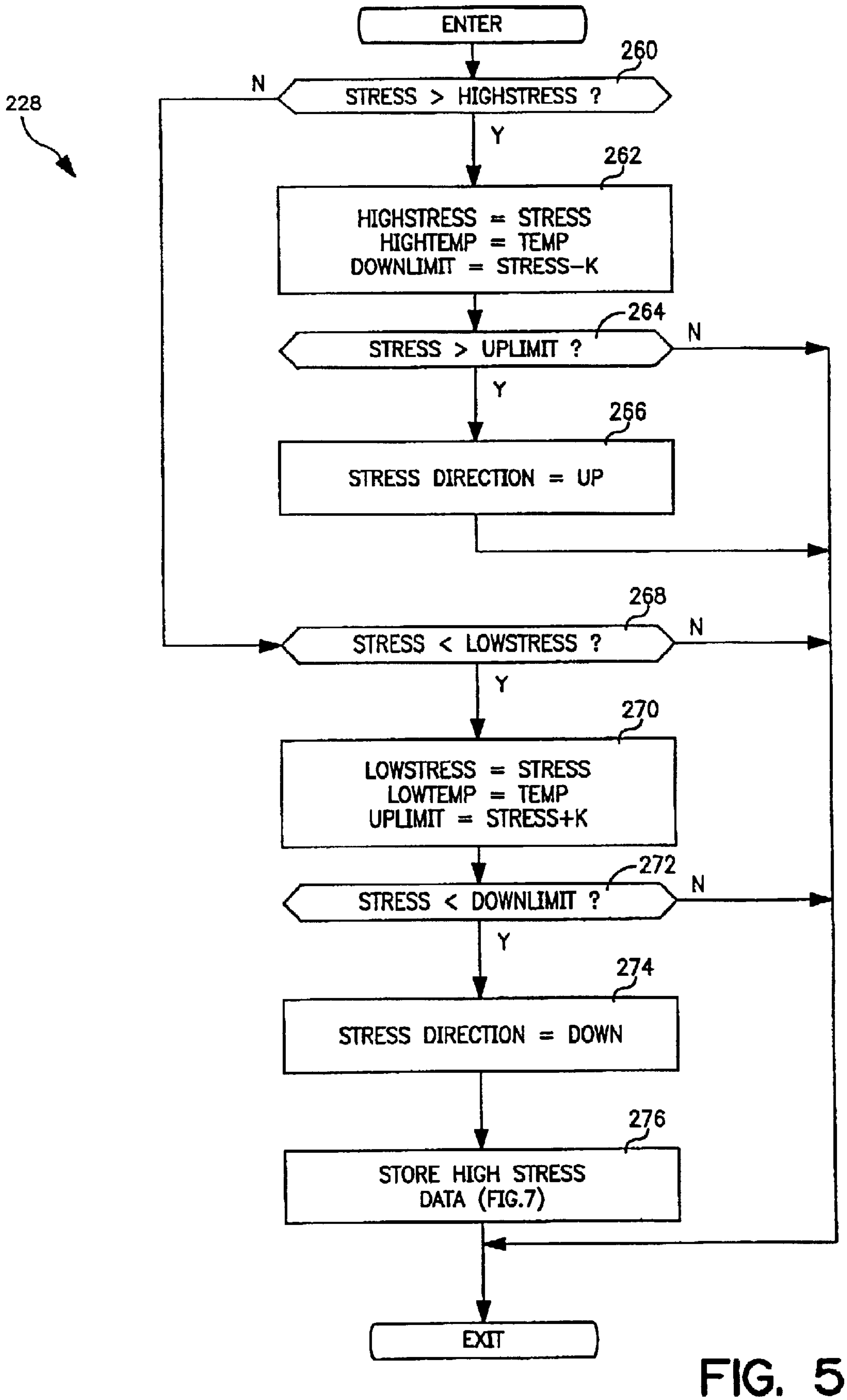

Referring to FIG. 5, there illustrated is a flowchart of the subroutine 228 that determines whether STRESS is increasing or decreasing. This subroutine is called from at least two locations in the subroutine 214 of FIG. 4, in which it was uncertain as to the direction of STRESS. After an enter step, control passes to a step 260 that checks if the current value of STRESS (from step 202 in FIG. 3) is greater than HIGHSTRESS (which was set to the previous value of STRESS in the step 218 of FIG. 4). If so, control passes to a step 262 that sets HIGHSTRESS equal to STRESS, HIGHTEMP equal to TEMP, and DOWNLIMIT equal to STRESS minus a predetermined constant. Control then passes to a step 264 that checks if STRESS is greater than UPLIMIT. If not, then control exits the subroutine 228 of FIG. 5. If so, control passes to a step 266 that sets STRESSDIRECTION equal to up. Control then exits the subroutine 228 of FIG. 5, as STRESS has been determined to be increasing.

If STRESS was determined in the step 260 to not be greater than HIGHSTRESS, control passes to a step 268 that checks if STRESS is less than LOWSTRESS. If not, control exits the subroutine 228 of FIG. 5, since the direction of STRESS is still uncertain. If STRESS is greater than LOWSTRESS, control passes to a step 270 that sets LOWSTRESS equal to STRESS, LOWTEMP equal to TEMP, and UPLIMIT equal to STRESS plus a predetermined constant. Control then passes to a step 272 that checks if STRESS is less than DOWNLIMIT. If not, control exits the subroutine 228 of FIG. 5. If so, control passes to a step 274 that sets STRESSDIRECTION equal to down. Control then passes to the subroutine 276 of FIG. 7 (described in detail hereinafter) that stores the high peak value of the STRESS data. This is done because the direction of STRESS has been determined in the step 272 to now be decreasing and it is desired to store the previously attained high peak value of STRESS for subsequent cycle pairing and fatigue life calculation. Control then exits the subroutine 228 of FIG. 5.

Figure 6:
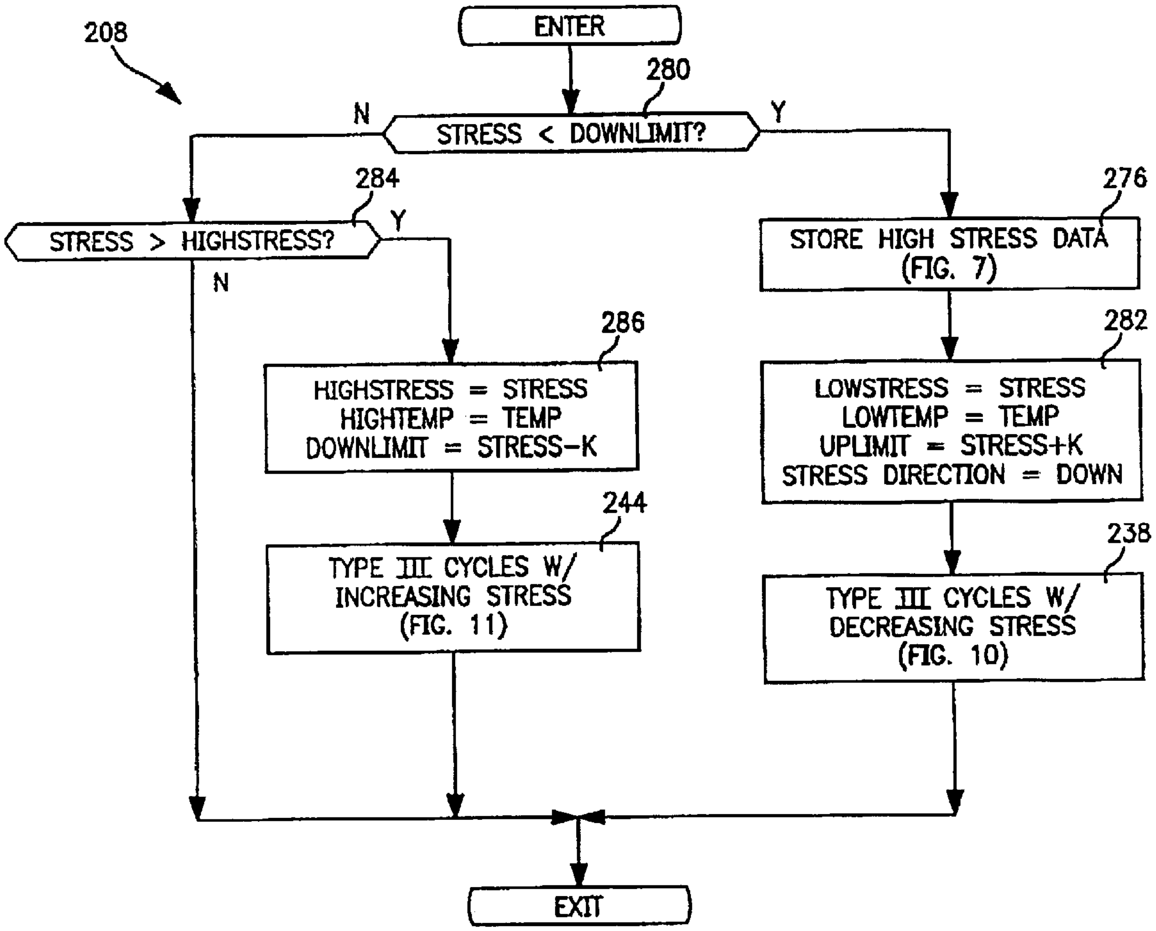

Referring to FIG. 6, there illustrated is a flowchart of the subroutine 208 that verifies that STRESS is increasing, as initially determined in the step 206 of the subroutine 200 of FIG. 3. After an enter step, control passes to a step 280 that checks if STRESS is less than DOWNLIMIT. If so, control passes to the subroutine 276 of FIG. 7 (described in detail hereinafter), which stores high peak values of STRESS. This is done because the direction of STRESS was determined in the step 280 to be decreasing (instead of increasing, as in the step 206 of the subroutine 200 of FIG. 3), and it is desired to store the previously attained high peak STRESS value for subsequent cycle paring and fatigue life calculation. Control then passes to a step 282 that sets LOWSTRESS equal to STRESS, LOWTEMP equal to TEMP, UPLIMIT equal to STRESS plus a predetermined constant, and STRESSDIRECTION equal to down. Control then passes to the subroutine 238 of FIG. 10 (described in detail hereinafter) which calculates the fatigue life of the fan disk. Control then exits the subroutine 208 of FIG. 6.

Instead, if STRESS is determined in the step 280 to not be less than DOWNLIMIT, control passes to a step 284 that checks if STRESS is greater than HIGHSTRESS. If not, control exits the subroutine 208 of FIG. 6. If so, control passes to a step 286 that sets HIGHSTRESS equal to STRESS, HIGHTEMP equal to TEMP, and DOWNLIMIT equal to STRESS minus a predetermined constant. A new high peak value for STRESS exists. Control then passes to the subroutine 244 of FIG. 11 (described in detail hereinafter) that calculates the fatigue life of the fan disk. Control then exits the subroutine 208 of FIG. 6.

Figure 7:
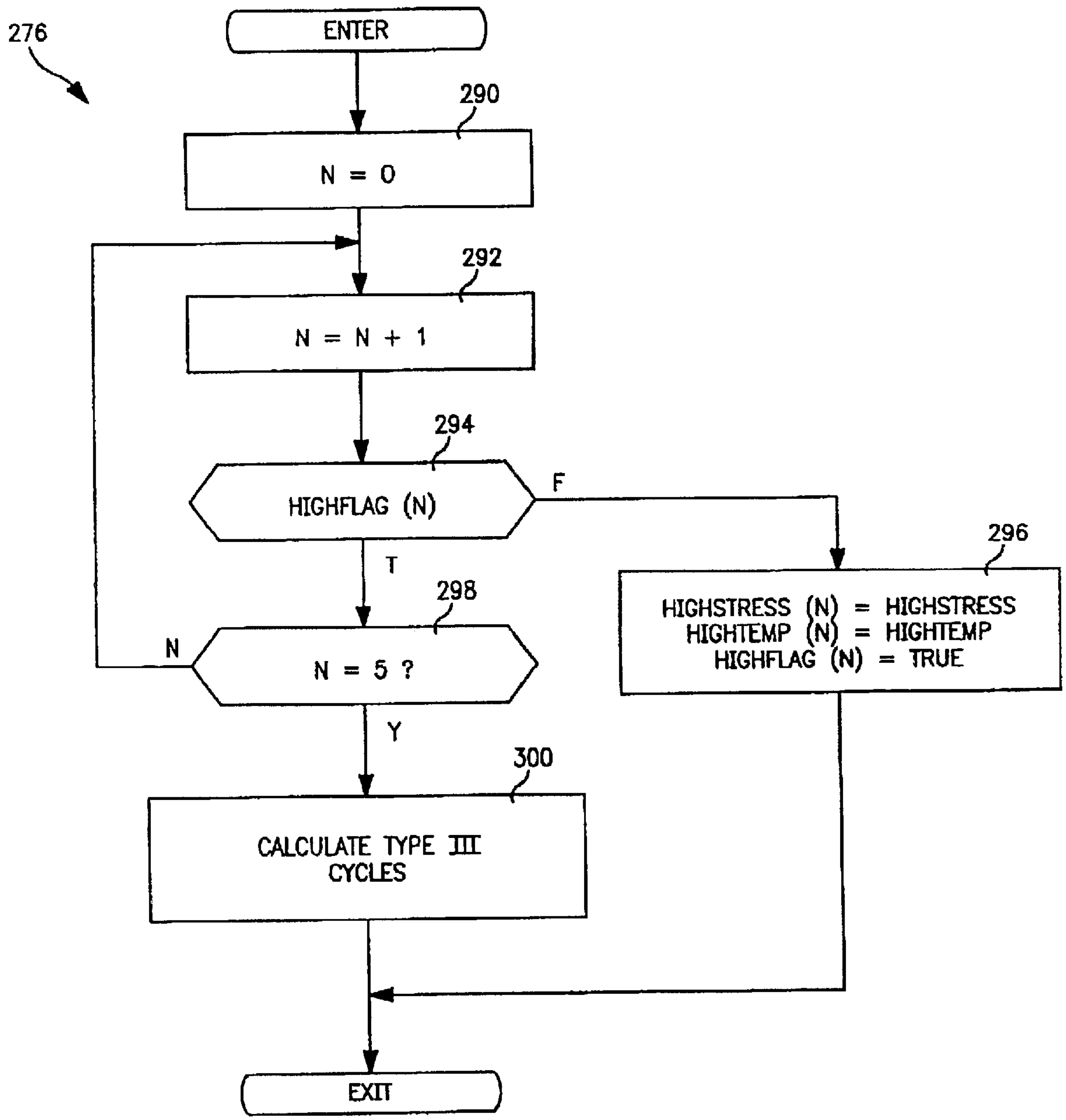

Referring to FIG. 7, there illustrated is a flowchart of the subroutine 276 that stores the high peak values for STRESS as they occur, as determined, for example, by the subroutines 228 and 208 of FIGS. 5 and 6, respectively. These high peak values are stored when STRESS changes from increasing to decreasing. It is desired to capture the high peak value just prior to this change in direction. This high peak value is then later paired with a corresponding low peak value for fatigue life calculation.

After an enter step, control passes to a step 290 that sets N equal to zero. Control then passes to a step 292 that increments N by one, and then to a step 294 that checks if HIGHFLAG(N) is true. If not, control branches to a step 296 that sets HIGHSTRESS(N) equal to HIGHSTRESS, HIGHTEMP(N) equal to HIGHTEMP, and HIGHFLAG(N) equal to true. Essentially, the subroutine 276 of FIG. 7 has determined the next ascending order location in memory 132 in which to store the current high peak value for STRESS. Control then exits the subroutine 276 of FIG. 7.

Instead, if the result of the step 294 indicates that HIGHFLAG(N) is true, control passes to a step 298 that checks if N equals five. If N does not equal five, control passes back to the step 292 that increments N by one. If N equals five, control passes to a step 300 that calculates the fatigue life (i.e., the "type III cycles") of the fan disk using the corresponding previously-stored values for HIGHSTRESS and HIGHTEMP, along with the previously stored N=5 values for LOWSTRESS(N) and LOWTEMP(N). That is, the calculation of fatigue life or cumulative damage is based on the cycle pair of high and low peak STRESS data values stored at the N equals five position in the HIGHSTRESS(N) and LOWSTRESS(N) arrays.

In this exemplary embodiment, the fatigue life is calculated by a relatively simple algebraic equation having numerical coefficients whose values depend on various physical characteristics of the material comprising the structure. The form of the equation and the values for these coefficients should be apparent to one of ordinary skill in the art. An exemplary equation for calculating the fatigue life of a diffuser portion of the engine 100 (instead of the fan disk) is given by:

$$\text{LIFE}=-K1-K2*TM-K3*SM+K4*(SM*R\text{-ratio}) \quad \text{(Eq. 3)}$$

Where: K1–K4 are constants; TM is the calculated (or sensed) temperature of the engine structural component (e.g., the diffuser portion) (where the temperature of the fan disk may be calculated in a similar manner to the temperature of the diffuser portion in Equation 2 given above); SM is the maximum value for the calculated stress (where the stress of the diffuser portion may be calculated in a similar manner to the stress of the fan disk aft web in Equation 1 given above); and R-ratio is a constant whose value is between 0.01 to 0.99 and indicates the result of a statistical analysis that indicates the "goodness of fit" or the normal of the algorithm to what the data is to be fitted to (the closer the value of the R-ratio to one, the better the fit).

Equation 3 is exemplary of life usage calculation for the diffuser, since in an exemplary embodiment, the calculation for the life usage of the fan disk does not involve the calculated or sensed temperature of the fan disk, whereas the diffuser portion did. The calculated value for the fatigue life is a running total that is stored in the memory 132. That is, each time the step 300 calculates the fatigue life or cumulative damage, that value is added to the previous total stored in memory. Also, it should be understood that Equation 3 is merely exemplary of one method for calculating the fatigue life of an engine component. Instead, other methods for calculating the fatigue life of the engine structure, which should be apparent to one of ordinary skill in the art in light of the teachings herein, may be used without departing from the broadest scope of the present invention. After calculating the fatigue life in the step 300, control exits the subroutine 276 of FIG. 7.

Figure 8:
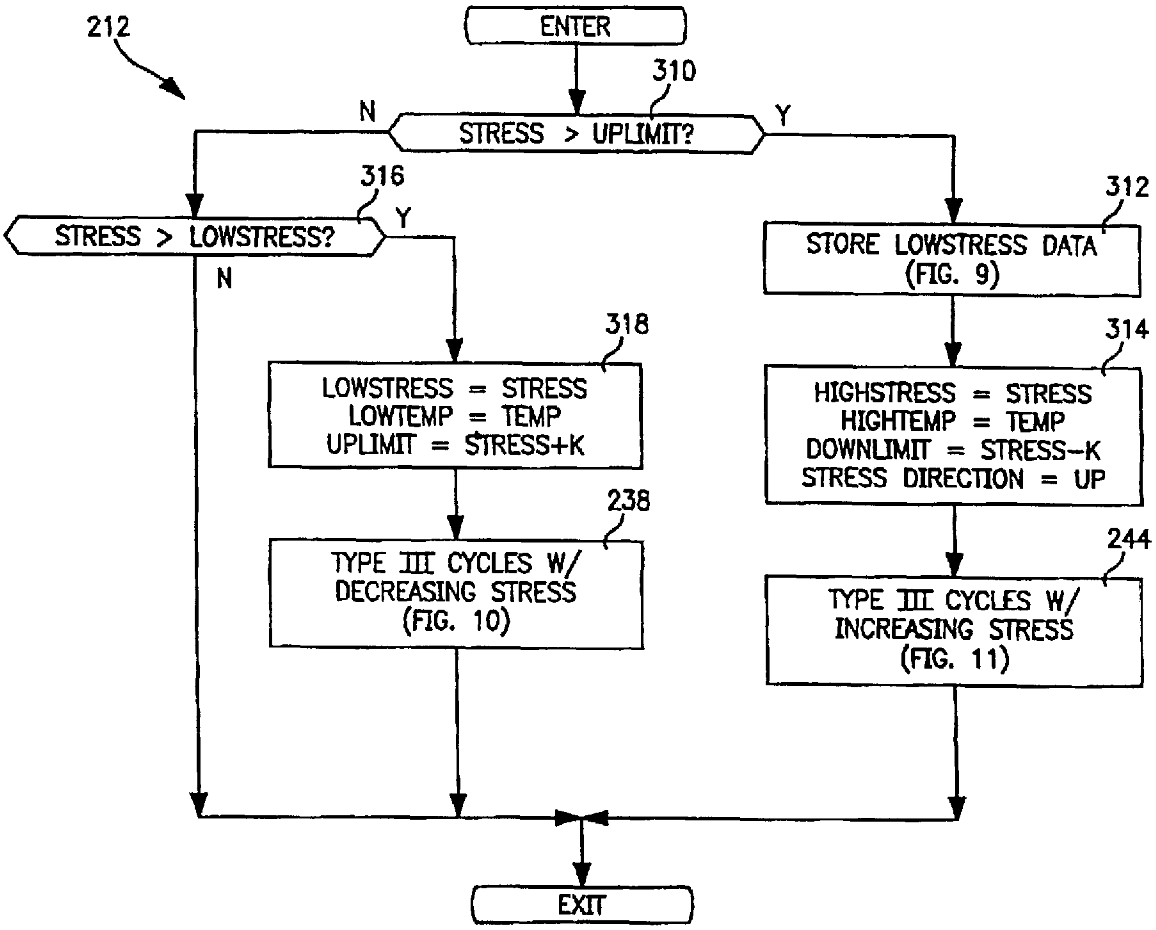

Referring to FIG. 8, there illustrated is a flowchart of the subroutine 212 that verifies STRESS is decreasing, as initially determined in the step 210 of the subroutine 200 of FIG. 3. After an enter step, control passes to a step 310 that checks if STRESS is greater than UPLIMIT. If so, control passes to the subroutine 312 of FIG. 9 (described in detail hereinafter), which stores low peak values of STRESS. This is done because the direction of STRESS was determined in the step 310 to be increasing (instead of decreasing, as determined in the step 210 of the subroutine 200 of FIG. 3), and it is desired to store the low peak STRESS values for subsequent cycle pairing and life usage calculations. Control then passes to a step 314 that sets HIGHSTRESS equal to STRESS, HIGHTEMP equal to TEMP, DOWNLIMIT equal to STRESS minus a predetermined constant, and STRESSDIRECTION equal to up. Control then passes to the subroutine 244 of FIG. 11 (described in detail hereinafter) which calculates the fatigue life (i.e., the "type III cycles") of the fan disk. Control then exits the subroutine 212 of FIG. 8.

Instead, if STRESS is determined in the step 310 to not be greater than UPLIMIT, control passes to a step 316 that checks if STRESS is less than LOWSTRESS. If not, control exits the subroutine 212 of FIG. 8. If STRESS is less than LOWSTRESS, control passes to a step 318 that sets LOWSTRESS equal to STRESS, LOWTEMP equal to TEMP, and UPLIMIT equal to STRESS plus a predetermined constant. A new low peak value for STRESS exists. Control then passes to the subroutine 238 of FIG. 10 (described in detail hereinafter) that calculates the fatigue life of the fan disk. Control then exits the subroutine 212 of FIG. 8.

Figure 9:
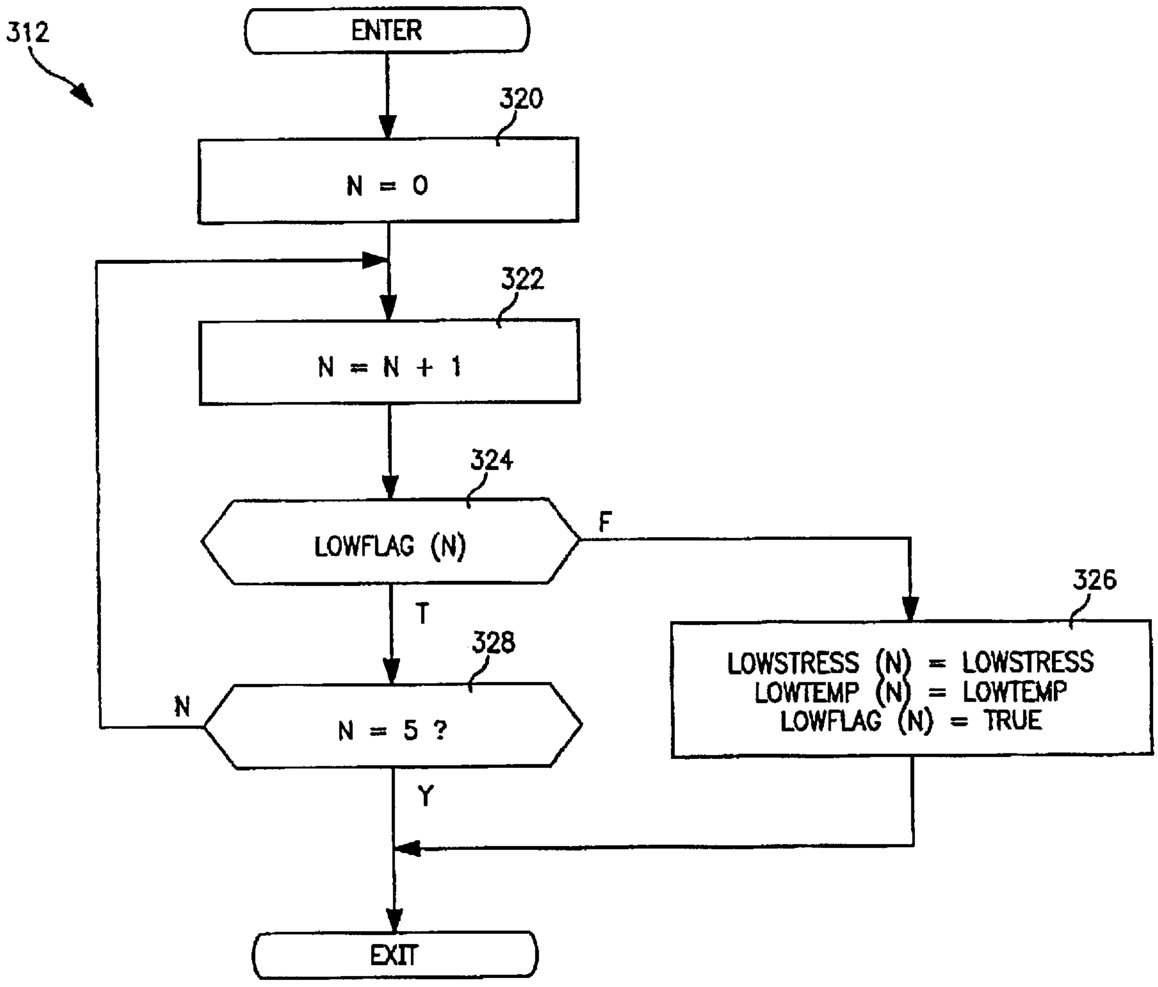

Referring to FIG. 9, there illustrated is a flowchart of the subroutine 312 that stores in memory 132 the low peak magnitude values for STRESS as they occur, as determined, for example, by the subroutine 212 of FIG. 8. Essentially, these low peak values are determined and stored when the magnitude of STRESS has changed direction from decreasing to increasing in value. It is desired to capture the low peak value just prior to this change in direction. This low peak value is then later paired with a corresponding high peak value for subsequent life usage calculations.

After an enter step, control passes to a step 320 that sets the array pointer, N, equal to zero. Control then passes to a step 322 that increments N by one, and then to a step 324 that checks if LOWFLAG(N) is true. If N is not true, control branches to a step 326 that sets LOWSTRESS(N) equal to LOWSTRESS, LOWTEMP(N) equal to LOWTEMP, and LOWFLAG(N) equal to true. The subroutine 312 of FIG. 9 determines the next ascending order position in memory 132 in which to store the current low peak value for STRESS, as calculated or measured in the subroutine 200 of FIG. 3. Control then exits the subroutine 312 of FIG. 9. Instead, if the result of the step 324 indicates that LOWFLAG(N) is true, control passes to a step 328 that checks if N equals five. If N does not equal five, control passes back to the step 322 that increments N by one. If N equals five, control exits the subroutine of FIG. 9.

Figure 10:
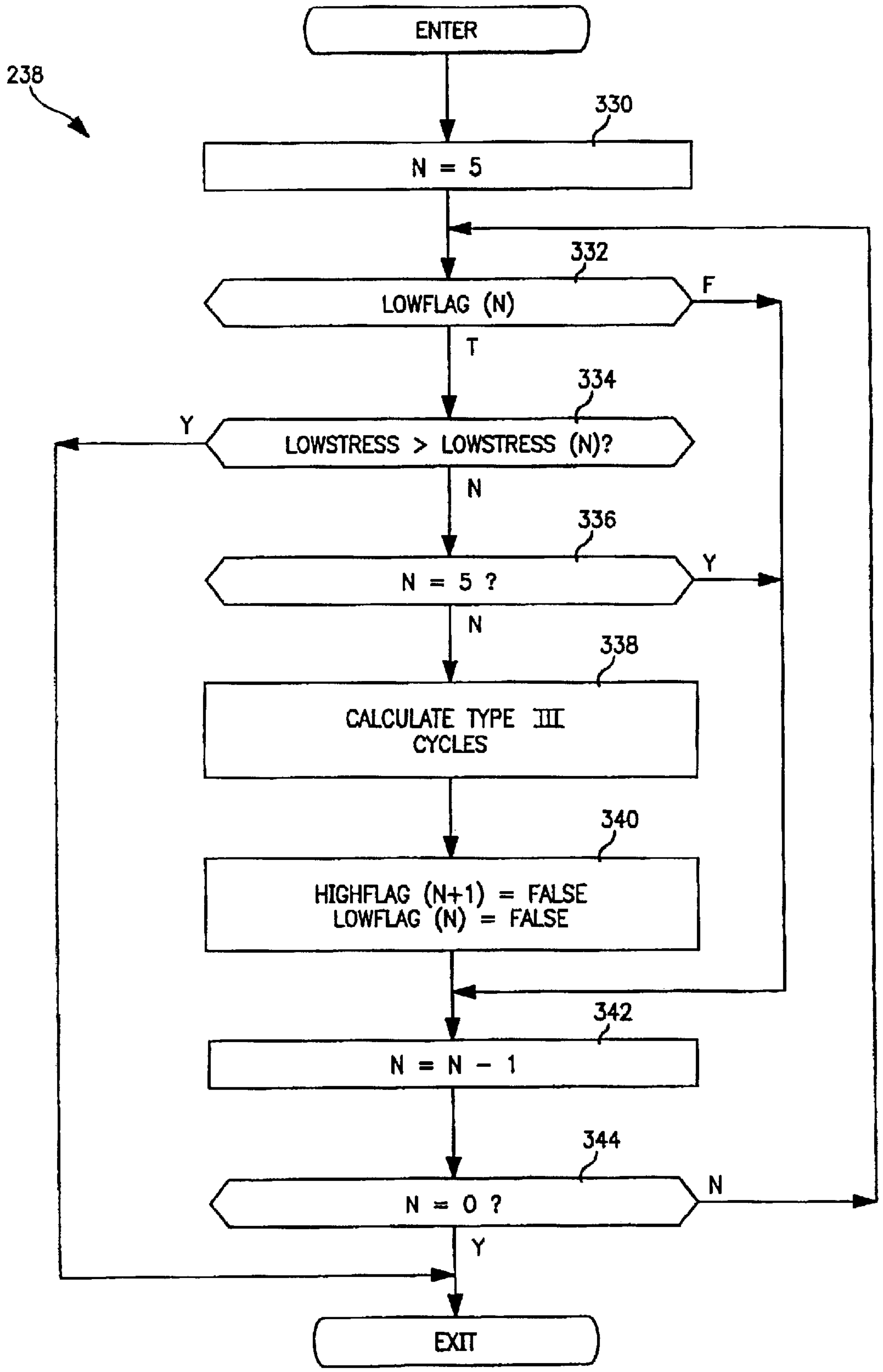

Referring to FIG. 10, there illustrated is a flowchart of the subroutine 238 that calculates the fatigue life (i.e., the "type III cycles") of the fan disk when STRESS is decreasing and cycle pairs of high and peak low STRESS values are available (as determined elsewhere in FIGS. 3–11). After an enter step, control passes to a step 330 that sets N equal to five, and then to a step 332 that checks if LOWFLAG(N) is true. If true, control passes to a step 334 that checks if LOWSTRESS is greater than LOWSTRESS(N). If greater, the subroutine 238 of FIG. 10 exits. If LOWSTRESS is not greater than LOWSTRESS(N), control passes to a step 336 that checks if N equals five. If not, control passes to a step 338 that calculates the fatigue life of the fan disk using HIGHSTRESS(N+1), LOWSTRESS(N), HIGHTEMP(N+1), and LOWTENP(N). This calculation may be performed using an equation similar to Equation 3 given above.

Control then passes to a step 340 that sets HIGHFLAG (N+1) to false and LOWFLAG(N) to false. Control then passes to a step 342 that decrements N by one, and then to a step 344 that checks if N equals zero. If N equals zero, the subroutine 238 of FIG. 10 exits. If N does not equal zero, control branches back to the step 332 that checks if LOWFLAG(N) is true. If LOWFLAG(N) is false, control passes to the step 342 that decrements N by one. Also, if the result of the step 336 is such that N equals five, control branches to the step 342 that decrements N by one.

Figure 11:
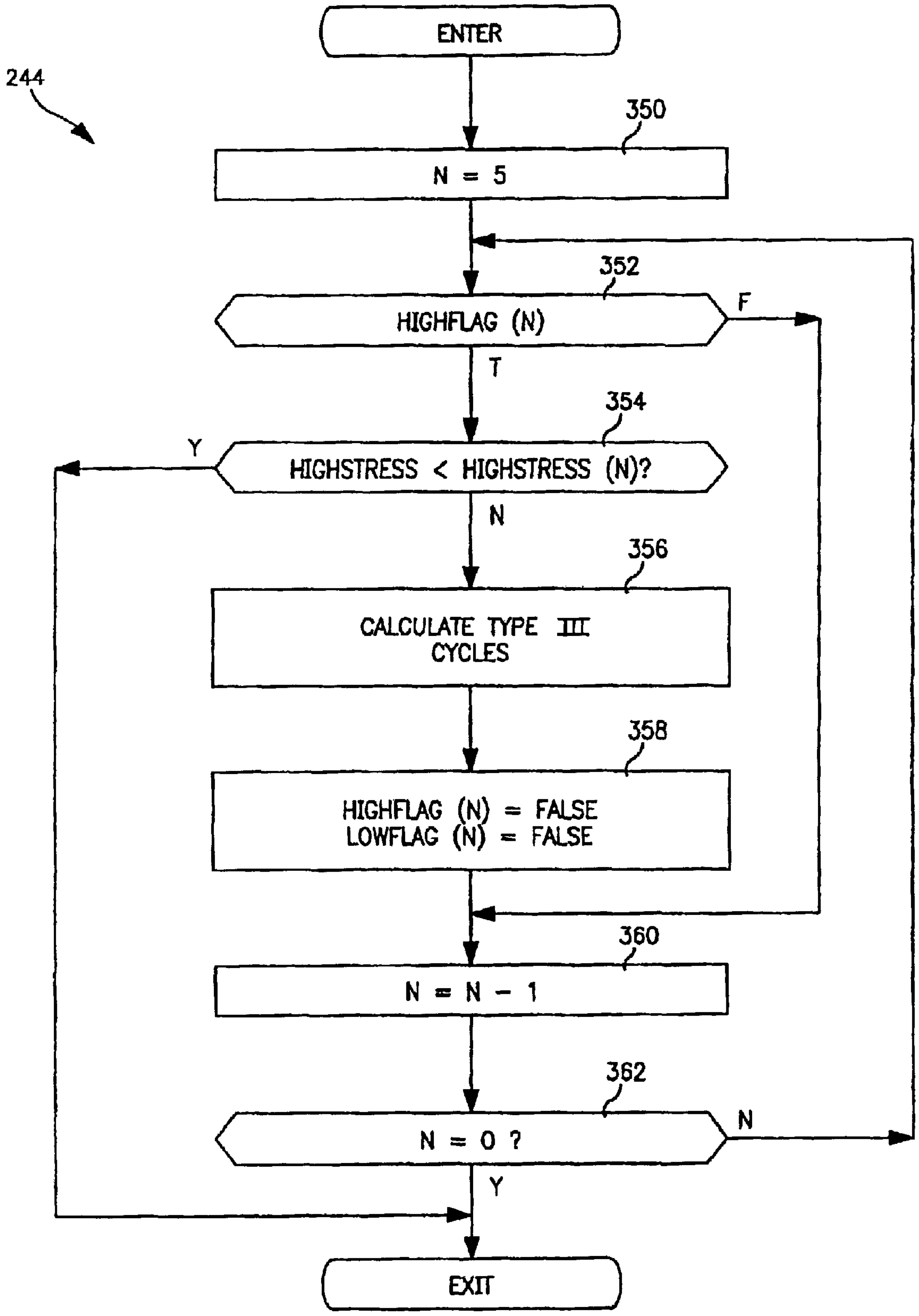

Referring to FIG. 11, there illustrated is a flowchart of the subroutine 244 that calculates the fatigue life of the fan disk when STRESS is increasing and cycle pairs of peak high and low STRESS values are available (as determined elsewhere in FIGS. 3–11). After an enter step, control passes to a step 350 that sets N equal to five, and then to a step 352 that checks if HIGHFLAG(N) is true. If true, control passes to a step 354 that checks if HIGHSTRESS is greater than HIGHSTRESS(N). If greater, the subroutine 244 of FIG. 11 exits. If HIGHSTRESS is not greater than HIGHSTRESS (N), control passes to a step 356 that calculates the fatigue life (i.e., the "type III cycles") of the fan disk using HIGHSTRESS(N), LOWSTRESS(N), HIGHTEMP(N), and LOWTEMP(N). This calculation may be performed using an equation similar to Equation 3 given above.

Control then passes to a step 358 that sets HIGHFLAG(N) to false and LOWFLAG(N) to false. Control then passes to a step 360 that decrements N by one, and then to a step 362 that checks if N equals zero. If N equals zero, the subroutine 244 of FIG. 11 exits. If N does not equal zero, control branches back to the step 352 that checks if HIGHFLAG(N) is true or false, and the subroutine 244 of FIG. 11 continues until it exits.

It should be understood that the previous teaching of how to calculate the stress forces on an engine structural component, together with calculating the resulting life usage of the component, is purely exemplary. Such teaching merely represents a best mode embodiment for such calculations. Other methods for such calculations should be apparent to one of ordinary skill in the art in light of the teachings herein.

Although the present invention has been shown and described herein with respect to detailed embodiments thereof, it will be understood by those skilled in the art that various other changes in the form and detail thereof may be made without departing from the broadest scope of the claimed invention in light of the teachings herein.

Having thus described the invention, what is claimed is:

1. A method for determining, in real time, the fatigue life of at least a portion of a structure, comprising the steps of:

determining the stress forces imposed on at least a portion of the structure;

determining, from the determined stress forces, a cycle pair comprising a pair of high and low peak magnitude values of the determined stress forces; and determining the fatigue life of at least a portion of the structure from the determined cycle pair.

2. The method of claim 1, further comprising the step of determining a temperature of at least a portion of the structure.

3. The method of claim 2, wherein the step of determining the fatigue life of at least a portion of the structure from the determined cycle pair further comprises the step of determining the fatigue life of at least a portion of the structure from the determined temperature of at least a portion of the structure.

4. The method of claim 2, wherein the step of determining the temperature on at least a portion of the structure comprises the steps of:

sensing a temperature of at least a portion of the structure; and calculating a temperature of at least a portion of the structure from the sensed temperature of at least a portion of the structure.

5. The method of claim 1, wherein the step of determining, from the determined stress forces, a cycle pair comprising a pair of high and low peak magnitude values of the determined stress forces further comprises the steps of:

determining whether the magnitudes of the determined stress forces are increasing or decreasing in direction and providing a first indication of whether the determined stress forces are increasing or decreasing in direction;

comparing the determined stress forces to the provided first indication of whether the determined stress forces are increasing or decreasing in direction to determine whether the magnitudes of the determined stress forces are increasing or decreasing in direction; and if the result of the comparing is such that the determined stress forces are opposite in direction to the provided first indication. of whether the determined stress forces are increasing or decreasing in direction, then storing a selected magnitude of the determined stress forces in the corresponding one of the increasing or decreasing directions indicated by the step of determining whether the magnitudes of the determined stress forces are increasing or decreasing in direction.

6. The method of claim 8, wherein if the result of the comparing is such that the determined stress forces are opposite in direction to the provided first indication of whether the determined stress forces are increasing or decreasing in direction, then further comprising the steps of determining whether the magnitudes of the determined stress forces are in the direction opposite to that of the provided first indication and providing a second indication of whether the determined stress forces are in the direction opposite to that of the provided first indication;

comparing the determined stress forces to the provided second indication to determine whether the magnitudes of the determined stress forces are in the direction of the provided first or second directions; and if the result of the comparing is such that the determined stress forces are in the direction of the provided first indication, then storing a selected magnitude of the determined stress forces in the direction of the provided second indication, and pairing the stored selected magnitude of the determined stress forces in each one of the directions indicated by the provided first and second indications, to thereby determine the cycle pair.

7. The method of claim 1, wherein the step of determining the stress forces imposed on at least a portion of the structure comprises the steps of:

sensing one or more parameters associated with at least a portion of the structure; and calculating the stress forces imposed on the at least a portion of the structure from the one or more sensed parameters associated with at least a portion of the structure.

8. The method of claim 1, wherein the step of determining the stress forces imposed on at least a portion of the structure comprises the step of determining, in real time, the stress forces imposed on at least a portion of the structure.

9. The method of claim 1, wherein the step of determining, from the determined stress forces, a cycle pair comprising a pair of high and low peak magnitude values of the determined stress forces comprises the step of determining, in real time, from the determined stress forces, a cycle pair comprising a pair of high and low peak magnitude values of the determined stress forces.

10. The method of claim 1, wherein the step of determining the fatigue life of at least a portion of the structure from the determined cycle pair comprises the step of determining, in real time, the fatigue life of at least a portion of the structure from the determined cycle pair.

11. The method of claim 1, wherein the step of determining the fatigue life of at least a portion of the structure from the determined cycle pair comprises the step of calculating the fatigue life of at least a portion of the structure from the determined cycle pair.

12. Apparatus for determining, in real time, the fatigue life of at least a portion of a structure, comprising:

means for determining, in real time, the stress forces imposed on at least a portion of the structure;

means for determining, in real time and from the determined stress forces, a cycle pair comprising a pair of high and low peak magnitude values of the determined stress forces; and means for determining, in real time, the fatigue life of at least a portion of the structure from the determined cycle pair.

13. The apparatus of claim 12, further comprising means for determining a temperature of at least a portion of the structure.

14. The apparatus of claim 13, wherein the means for determining, in real time, the fatigue life of at least a portion of the structure from the determined cycle pair further comprises means for determining, in real time, the fatigue life of at least a portion of the structure from the determined temperature of at least a portion of the structure.

15. The apparatus of claim 13, wherein the means for determining the temperature on at least a portion of the structure further comprises:

means for sensing a temperature of at least a portion of the structure; and means for calculating a temperature of at least a portion of the structure from the sensed temperature of at least a portion of the structure.

16. The apparatus of claim 12, wherein the means for determining, in real time and from the determined stress forces, a cycle pair comprising a pair of high and low peak magnitude values of the determined stress forces further comprises:

means for determining whether the magnitudes of the determined stress forces are increasing or decreasing in direction and providing a first indication of whether the determined stress forces are increasing or decreasing in direction; and means for comparing the determined stress forces to the provided first indication of whether the determined stress forces are increasing or decreasing in direction to determine whether the magnitudes of the determined stress forces are increasing or decreasing in direction, and if the result of the comparing is such that the determined stress forces are opposite in direction to the provided first indication of whether the determined stress forces are increasing or decreasing in direction, then for storing a selected magnitude of the determined stress forces in the corresponding one of the increasing or decreasing directions indicated by the means for determining whether the magnitudes of the determined stress forces are increasing or decreasing in direction.

17. The apparatus of claim 16, wherein if the result of the comparing is such that the determined stress forces are opposite in direction to the provided first indication of whether the determined stress forces are increasing or decreasing in direction, then further comprising:

means for determining whether the magnitudes of the determined stress forces are in the direction opposite to that of the provided first indication, and for providing a second indication of whether the determined stress forces are in the direction opposite to that of the provided first indication; and means for comparing the determined stress forces to the provided second indication to determine whether the magnitudes of the determined stress forces are in the direction of the provided first or second directions, and if the result of the comparing is such that the determined stress forces are in the direction of the provided first indication, then for storing a selected magnitude of the determined stress forces in the direction of the provided second indication, and for pairing the stored selected magnitude of the determined stress forces in each one of the directions indicated by the provided first and second indications, to thereby determine the cycle pair.

18. The apparatus of claim 12, wherein the means for determining, in real time, the stress forces imposed on at least a portion of the structure further comprises:

means for sensing one or more parameters associated with at least a portion of the structure; and means for calculating the stress forces imposed on the at least a portion of the structure from the one or more sensed parameters associated with at least a portion of the structure.

19. The apparatus of claim 12, wherein the means for determining, in real time, the fatigue life of at least a portion of the structure from the determined cycle pair further comprises means for calculating the fatigue life of at least a portion of the structure from the determined cycle pair.

20. A method for determining in real time the fatigue life of at least one component of an engine comprising the steps of:

monitoring two engine parameters;

transmitting said two monitored parameters to a processing unit;

determining the stress forces imposed on said at least one engine component from said two transmitted monitored parameters;

determining from said determined stress forces a cycle pair comprising a pair of high and low peak magnitude values of the determined stress forces; and determining the fatigue life of said at least one engine component from the determined cycle pair.

21. A method according to claim 20, further comprising:

monitoring a temperature of at least a portion of said engine; and transmitting said monitored temperature to said processing unit.

22. A method according to claim 21, wherein said temperature monitoring step comprises monitoring in real time a compressor inlet temperature.

23. A method according to claim 21, further comprising determining said fatigue life of said at least one engine component using said monitored temperature.

24. A method according to claim 20, wherein the cycle pair determining step comprises:

determining whether the magnitudes of the determined stress forces are increasing or decreasing in direction and providing a first indication of whether the determined stress forces are increasing or decreasing in direction;

comparing the determined stress forces to the provided first indication of whether the determined stress forces are increasing or decreasing in direction to determine whether the magnitudes of the determined stress forces are increasing or decreasing in direction; and if the result of the comparing is such that the determined stress forces are opposite in direction to the provided first indication of whether the determined stress forces are increasing or decreasing in direction, then storing a selected magnitude of the determined stress forces in the corresponding one of the increasing or decreasing directions indicated by the step of determining whether the magnitudes of the determined stress forces are increasing or decreasing in direction.

25. A method according to claim 24, wherein if the result of the comparing is such that the determined stress forces are opposite in direction to the provided first indication of whether the determined stress forces are increasing or decreasing in direction, then further comprising the steps of:

determining whether the magnitudes of the determined stress forces are in the direction opposite to that of the provided first indication and providing a second indication of whether the determined stress forces are in the direction opposite to that of the provided first indication;

comparing the determined stress forces to the provided second indication to determine whether the magnitudes of the determined stress forces are in the direction of the provided first or second directions; and if the result of the comparing is such that the determined stress forces are in the direction of the provided first indication, then storing a selected magnitude of the determined stress forces in the direction of the provided second indication, and pairing the stored selected magnitude of the determined stress forces in each one of the directions indicated by the provided first and second indications, to thereby determine the cycle pair.

26. A method according to claim 20, wherein said monitoring step comprises monitoring in real time pressure at an inlet of a compressor and fan combination and monitoring in real time a speed for said combination.

27. A system for determining in real time the fatigue life of an engine component comprising:

means for monitoring two engine parameters;

means for transmitting the two monitored parameters to a processing unit;

means for determining stress forces imposed on said at least one engine component from said two transmitted parameters;

means for determining from said determined stress forces a cycle pair comprising a pair of high and low peak magnitude values of the determined stress forces; and means for determining the fatigue life of said at least one engine component from the determined cycle pair.

28. A system according to claim 27, further comprising means for monitoring a temperature of at least a portion of said engine and means for transmitting said monitored temperature to said processing unit.

29. A system according to claim 28, wherein said temperature monitoring means comprises means for monitoring in real time a compressor inlet temperature.

30. A system according to claim 28, wherein said fatigue life determining means includes means which uses said monitored temperature to determine said fatigue life.

31. A system according to claim 27, wherein the cycle pair determining means comprises:

means for determining whether the magnitudes of the determined stress forces are increasing or decreasing in direction and providing a first indication of whether the determined stress forces are increasing or decreasing in direction; and means for comparing the determined stress forces to the provided first indication of whether the determined stress forces are increasing or decreasing in direction to determine whether the magnitudes of the determined stress forces are increasing or decreasing in direction, and if the result of the comparing is such that the determined stress forces are opposite in direction to the provided first indication of whether the determined stress forces are increasing or decreasing in direction, then for storing a selected magnitude of the determined stress forces in the corresponding one of the increasing or decreasing directions indicated by the means for determining whether the magnitudes of the determined stress forces are increasing or decreasing in direction.

32. A system according to claim 31, wherein if the result of the comparing is such that the determined stress forces are opposite in direction to the provided first indication of whether the determined stress forces are increasing or decreasing in direction, then further comprising:

means for determining whether the magnitudes of the determined stress forces are in the direction opposite to that of the provided first indication, and for providing a second indication of whether the determined stress forces are in the direction opposite to that of the provided first indication; and means for comparing the determined stress forces to the provided second indication to determine whether the magnitudes of the determined stress forces are in the direction of the provided first or second directions, and if the result of the comparing is such that the determined stress forces are in the direction of the provided first indication, then for storing a selected magnitude of the determined stress forces in the direction of the provided second indication, and for pairing the stored selected magnitude of the determined stress forces in each one of the directions indicated by the provided first and second indications, to thereby determine the cycle pair.

33. A system according to claim 27, wherein said monitoring means comprises a first sensor for sensing real time pressure at an inlet of a compressor and fan combination and a second sensor for sensing real-time speed for said combination.

34. A method for determining in real time the fatigue life of at least a portion of a structure comprising the steps of:

determining the stress forces imposed on at least a portion of the structure;

determining from the determined stress forces a cycle pair comprising a pair of high and low peak magnitude values of the determined stress forces;

determining the fatigue life of at least a portion of the structure from the determined cycle pair; and the cycle pair determining step comprising determining whether the magnitudes of the determined stress forces are increasing or decreasing in direction and providing a first indication of whether the determined stress forces are increasing or decreasing in direction, comparing the determined stress forces to the provided first indication of whether the determined stress forces are increasing or decreasing in direction to determine whether the magnitudes of the determined stress forces are increasing or decreasing in direction; and if the result of the comparing is such that the determined stress forces are increasing or decreasing in direction, then storing a selected magnitude of the determined stress forces in the corresponding one of the increasing or decreasing directions indicated by the step of determining whether the magnitudes of the determined stress forces are increasing or decreasing in direction.

35. An apparatus for determining in real time the fatigue life of at least a portion of a structure comprising:

means for determining in real time the stress forces imposed on at least a portion of the structure;

means for determining in real time and from the determined stress forces a cycle pair comprising a pair of high and low peak magnitude values of the determined stress forces;

means for determining in real time the fatigue life of at least a portion of the structure from the determined cycle pair; and said cycle pair determining means comprising means for determining whether the magnitudes of the determined stress forces are increasing or decreasing in direction and providing a first indication of whether the determined stress forces are increasing or decreasing in direction and means for comparing the determined stress forces to the provided first indication of whether the determined stress forces are increasing or decreasing in direction to determine whether the magnitudes of the determined stress forces are increasing or decreasing in direction, and if the result of the comparing is such that the determined stress forces are opposite in direction to the provided first indication of whether the determined stress forces are increasing or decreasing in direction, then for storing a selected magnitude of the determined stress forces in the corresponding one of the increasing or decreasing directions indicated by the means for determining whether the magnitudes of the determined stress forces are increasing or decreasing in direction.

* * * * *